(12) United States Patent
Baehr et al.

(10) Patent No.: US 11,181,143 B2
(45) Date of Patent: Nov. 23, 2021

(54) DEVICE FOR RECEIVING A ROTATABLE WORKPIECE

(71) Applicant: Schenck RoTec GmbH, Darmstadt (DE)

(72) Inventors: Joachim Baehr, Darmstadt (DE); Felix Lachmann, Muehltal (DE)

(73) Assignee: Schenck RoTec GmbH, Darmstadt (DE)

( * ) Notice: Subject to any disclaimer, the term of this patent is extended or adjusted under 35 U.S.C. 154(b) by 396 days.

(21) Appl. No.: 16/330,031

(22) PCT Filed: Sep. 7, 2017

(86) PCT No.: PCT/DE2017/100749
§ 371 (c)(1),
(2) Date: Mar. 1, 2019

(87) PCT Pub. No.: WO2018/046062
PCT Pub. Date: Mar. 15, 2018

(65) Prior Publication Data
US 2019/0211869 A1    Jul. 11, 2019

(30) Foreign Application Priority Data
Sep. 8, 2016    (DE) .................... 10 2016 116 834

(51) Int. Cl.
*F16C 41/00*    (2006.01)
*F16C 17/26*    (2006.01)
(Continued)

(52) U.S. Cl.
CPC ................ *F16C 17/26* (2013.01); *B23Q 3/10* (2013.01); *F16C 13/04* (2013.01); *F16C 17/02* (2013.01);
(Continued)

(58) Field of Classification Search
CPC ........ F16C 13/04; F16C 17/035; F16C 17/10; F16C 17/105; F16C 17/26; F16C 23/02;
(Continued)

(56) References Cited

U.S. PATENT DOCUMENTS 1,486,115 A     3/1924  Allen
1,547,487 A  *  7/1925  Allen ...................... G01M 1/04
                                                            73/479

(Continued)

FOREIGN PATENT DOCUMENTS

| DE | 1140742 B | * 12/1962 | ............. G01M 1/04 |
| DE | 11 47 742 B | 4/1963 | |
| DE | 211 988 A1 | 8/1984 | |
| DE | 10 2014 106 334 A1 | 11/2015 | |
| GB | 1346133 A | * 2/1974 | ............. F16C 13/04 |

OTHER PUBLICATIONS

International Search Report in PCT/DE2017/100749, dated Nov. 15, 2017.

*Primary Examiner* — Phillip A Johnson
(74) *Attorney, Agent, or Firm* — Collard & Roe, P.C.

(57) ABSTRACT

The invention relates to a device for receiving a workpiece in a bearing device for rotatably mounting the workpiece about a bearing axis (L) associated with a workpiece bearing surface. The device comprises a bearing pedestal (14) including a bearing element (1) which has two concavely cylindrical bearing surfaces (5, 6) that lie next to one another in the same bearing plane and symmetrically to a plane of symmetry containing the bearing axis (L), the cylinder radii of the cylindrical bearing surfaces being greater than the radius of the workpiece bearing surface for which the bearing device is intended, wherein the cylinder axes of the two bearing surfaces (5, 6) are parallel to the bearing axis (L) and have a distance between each other.

11 Claims, 2 Drawing Sheets

(51) Int. Cl.
*F16C 23/02* (2006.01)
*G01M 1/04* (2006.01)
*F16C 17/02* (2006.01)
*F16C 13/04* (2006.01)
*B23Q 3/10* (2006.01)

(52) U.S. Cl.
CPC ............ *F16C 23/02* (2013.01); *F16C 41/005* (2013.01); *G01M 1/04* (2013.01)

(58) Field of Classification Search
CPC ...... F16C 25/02; F16C 33/046; F16C 41/005; B23Q 3/005; B23Q 3/02; B23Q 3/10; G01M 1/02; G01M 1/04
See application file for complete search history.

(56) References Cited

U.S. PATENT DOCUMENTS

| | | | | |
|---|---|---|---|---|
| 2,461,645 | A * | 2/1949 | Kallmann | G01L 1/16 73/465 |
| 2,594,581 | A * | 4/1952 | Phelps | G01M 1/04 73/475 |
| 3,145,513 | A | 8/1964 | Porath | |
| 3,572,079 | A * | 3/1971 | Bond | F16C 13/04 72/245 |
| 4,032,199 | A * | 6/1977 | Jenness | B02C 17/181 384/310 |
| 7,314,313 | B2 * | 1/2008 | Rogalla | F16C 13/04 384/117 |
| 2017/0030795 | A1 | 2/2017 | Baehr et al. | |

* cited by examiner

DEVICE FOR RECEIVING A ROTATABLE WORKPIECE

CROSS REFERENCE TO RELATED APPLICATIONS

This application is the National Stage of PCT/DE2017/100749 filed on Sep. 7, 2017, which claims priority under 35 U.S.C. § 119 of German Application No. 10 2016 116 834.3 filed on Sep. 8, 2016, the disclosure of which is incorporated by reference. The international application under PCT article 21(2) was not published in English.

The invention relates to a device for receiving a workpiece in a machine for correcting an unbalance of the workpiece, comprising a bearing device arranged on a machine frame for rotatably mounting the workpiece about a bearing axis associated with a workpiece bearing surface, wherein the bearing device comprises a bearing pedestal including a bearing element which has a concavely curved bearing surface.

Balancing machines are used to measure and correct the unbalance of rotors and, in general, are used for a variety of rotors differing from one another in terms of diameter and also the axial positions of the bearing surfaces thereof. Crankshafts are a typical example, which are intended for use with a variety of engines and may have different main bearing diameters, different separations and different lengths. So as to precisely correct an existing unbalance, the respective rotor must be received on the bearing surfaces thereof in a position centred with respect to the bearing axis of the balancing machine.

In a device known from DE 10 2014 106 334 A1, the workpiece is received by bearing elements of a bearing device, wherein the bearing elements are each adapted to the diameter of the workpiece bearing surface so as to exactly centre the workpiece. So as to be able to alternately receive workpieces of different bearing diameters, the bearing device comprises a bearing pedestal including at least two bearing elements differing in diameter and lying next to one another transversely to the bearing axis, wherein the bearing pedestal can be moved transversely to the bearing axis of the bearing device into two bearing positions, and wherein in each of the two bearing positions a different one of the two bearing elements is aligned centrally to the bearing axis.

A device for receiving a bearing journal of a rotor in a balancing machine is known from U.S. Pat. No. 1,486,115, comprising a bearing pedestal, which comprises bearing elements settable at an angular separation of 90° radially with respect to the bearing axis and carrying a bearing shoe forming the bearing surface at the ends facing the bearing journal. The bearing surface of the bearing shoe is adapted to the diameter of the bearing journal. A range of bearing shoes having different radii of curvature is kept available for different bearing diameters, among which the one matching the particular bearing journal can be selected.

Furthermore, a V-shaped mount for the bearing journals of a rotor to be balanced in a balancing machine is known from DE 11 47 742 B. The V-shaped mount is formed of two prisms having support surfaces planar in the axial direction of the rotor, wherein the prisms can be rotated about an axis extending parallel to the support surface and transversely to the bearing axis.

In a steady rest for supporting rollers having different journal diameters known from DD 211 988 A1, the roller is guided by way of at least two support surfaces, which are turned out approximately with the radius of the journals to be received. The support surfaces are formed by flattened bearing pins, which are rotatably mounted in cylindrical recesses of a pad. A slight rotation in the pad results in a precise adaptation of the support surfaces to the running face of the roller journal.

A steady rest for a grinding machine is known from U.S. Pat. No. 3,145,513 A1 which comprises two lower bearing elements and one upper bearing element for rotatably mounting a workpiece. The bearing elements can be moved radially and the radial positions thereof can be set and fixed using a locking screw arranged on a side opposite the bearing surfaces.

It is the object of the invention to provide a device of the type mentioned at the outset, which is suitable for different diameters of workpiece bearing surfaces and can be produced cost-effectively and which ensures gentle contact with the workpiece bearing surface.

The object is achieved according to the invention by a device having the features described in claim 1. Advantageous embodiments of the device are described in the dependent claims.

According to the invention, the device comprises a bearing device, arranged on a machine frame, for rotatably mounting the workpiece about a bearing axis associated with a workpiece bearing surface, wherein the bearing device comprises a bearing pedestal including a bearing element, which is composed of a rigid body and has two concavely cylindrical bearing surfaces located next to one another in the same bearing plane and symmetrically with respect to a centre plane containing the bearing axis, the cylinder radii thereof being greater than the radius of the workpiece bearing surface for which the bearing device is intended, wherein the cylinder axes of the two bearing surfaces are parallel to the bearing axis and have a distance between each other.

The device according to the invention has the advantage that workpiece bearing surfaces having differing diameters can be received and exactly centred in the holder. Two support areas result for the workpiece on the bearing element, against which the workpiece bearing surface rests, namely one on each of the two curved bearing surfaces of the bearing element. The support areas have a distance between each other, which results from the distance between the cylinder axes of the concavely cylindrical bearing surfaces and which depends on the distance between the cylinder axis and the ratio of the radius of the workpiece bearing surface to the difference between the cylinder radius of the bearing surfaces and the radius of the workpiece bearing surface.

An essential advantage of the bearing device according to the invention, compared to the V-shaped mounting known only for lightweight rotors by way of prisms, is that the bearing surfaces of the bearing element have a concave curvature following approximately the curvature of the workpiece bearing surface so that, due to the lower difference in curvature between the workpiece bearing surface and the curved bearing surfaces, the Hertzian stress occurring at the points of contact of the bearing surfaces is considerably lower. This allows the bearing forces acting on the workpiece during the correction of the unbalance to be better absorbed on the workpiece bearing surface, and the workpiece bearing surface is subjected to less load. This significantly lowers the risk of damage to the workpiece bearing surface.

As a result of the arrangement of the bearing surfaces of the bearing element, it is possible to receive workpieces having differing bearing diameters using the same bearing element without any disadvantage, wherein the limit of the receivable diameters to the upside is determined by the cylinder radius of the curved bearing surfaces and the distance between the cylinder axes. To the downside, the limit is defined by the increasing difference in curvature between the bearing surfaces and the workpiece bearing surface and by the decreasing distance of the points of contact between the workpiece bearing surface and the bearing surfaces with decreasing radius of the workpiece bearing surface. A comparatively wide variation range nonetheless remains between these limits, which is satisfactory for a wide variety of applications, for example for receiving crankshafts for vehicle engines.

According to a further proposed aspect of the invention, the bearing pedestal comprises at least two bearing elements designed according to the invention, which are arranged next to one another in the same bearing plane and are associated with a bearing axis, wherein the centre axes of the bearing elements are aligned radially with respect to the bearing axis and form an angle with one another, and the bearing elements can be set in relation to the bearing pedestal in the direction of the centre axes thereof for adaptation to the radius of the workpiece bearing surface and can be fixed on the bearing pedestal in a position that is adapted to a radius of the workpiece bearing surface. This refinement increases the number of support areas, thereby lowering the local stress on the workpiece bearing surface and improving the stability of the centring of the rotatable mounting the workpiece. The angle of the centre axes of the bearing elements is preferably in a range of 60° to 120°.

So as to set and fix the radial position of the bearing elements in relation to the bearing pedestal, according to the invention the bearing elements, on a side facing away from the bearing surfaces, can each include a support surface by way of which these rest against setting devices arranged in the bearing pedestal for setting a position that is adapted to a radius of the workpiece bearing surface. According to the invention, a particularly advantageous setting device can include one or more setting plates, which can be inserted in a space between the support surface of the bearing element and a counter bearing surface formed in the bearing pedestal. The setting plates allow the bearing device to be adapted easily, and with little time expenditure, to different diameters of workpiece bearing surfaces. The setting plates are preferably cuboid and include parallel end faces resting against the support surface and the counter bearing surface, the distance between the end faces being variable by way of a material removal process, such as grinding. By repeatedly using setting plates once they have been produced, it is possible to implement the settings of the bearing elements easily, quickly and precisely for regularly recurring dimensions of workpieces.

Instead of or in addition to setting plates, the setting device can comprise a setting screw, which is arranged in a threaded hole in the bearing pedestal and can be displaced in relation to the bearing pedestal by rotation in the direction of the centre axis.

According to a further proposed aspect of the invention, the bearing pedestal can include a pocket that is open on one side, in which the bearing element is guided and held in the direction of the centre axis. The bearing element can be securely clamped in the pocket by way of a clamping device, for example a clamping screw extending through the wall of the pocket.

A frequent method for correcting unbalance is the removal of material from the workpiece to be corrected, such as by drilling, milling or grinding. Material chips may be incurred in the process and find their way onto the bearing surfaces of the bearing elements. Adhering chips must therefore be cleaned off the bearing surfaces before a new workpiece is received in the device. For this purpose, according to the invention the bearing element has a groove, which extends in the centre between the bearing surfaces in the direction of the bearing axis and is connected to a borehole extending through the bearing element and connectable to a ventilation duct. Preferably, the bearing pedestal is provided with a ventilation duct to which the borehole of the bearing element is connected. Additionally, the ventilation duct, in addition to the bearing elements, can include outlet openings, which are located opposite the workpiece bearing surface and help to create an air flow cleaning the bearing surfaces.

The invention will be described in greater detail hereafter based on an exemplary embodiment of the invention, which is shown in the drawing. In the drawings.

Figure 1:
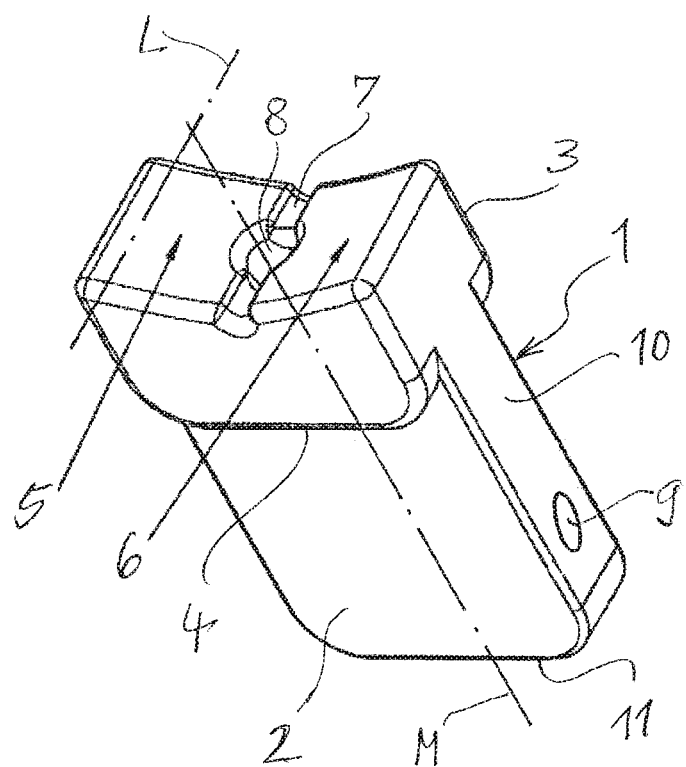
FIG. 1 is a perspective view of a bearing element according to the invention.

The bearing element 1 shown in FIG. 1 is composed of a rigid body, which is broken down into a substantially cuboid retaining portion 2 and a bearing portion 3 and has a symmetrical shape with respect to a plane of symmetry determined by a center axis M and a bearing axis L intersecting said centre axis. The bearing axis L shown in the drawing is equivalent to the axis of rotation of a workpiece, which can be rotatably mounted on the bearing element 1 by way of a cylindrical workpiece bearing surface. Since the bearing element 1 is intended for different diameters of workpiece bearing surfaces, the position of the bearing axis L, which is dependent on the diameter of the workpiece bearing surface, may be displaced parallel along the centre axis M in relation to the position shown in the drawing.

Figure 3:
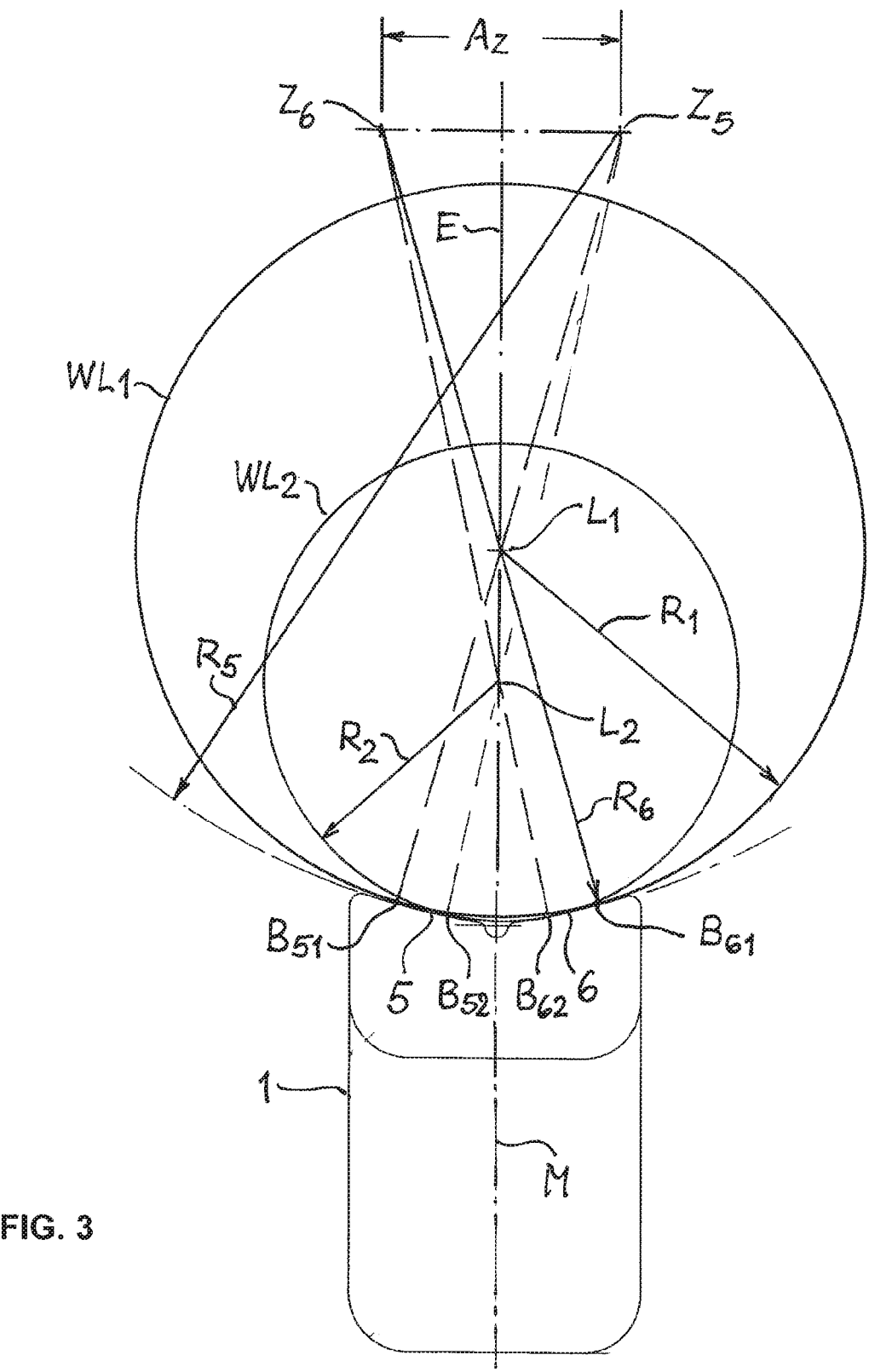
FIG. 3 is a graphical representation to illustrate the mounting of workpiece bearing surfaces having differing diameters on the bearing surfaces of a bearing element according to the invention.

In the direction of the bearing axis L, the bearing portion 3 is thicker than the retaining portion 2 and is therefore offset therefrom by steps 4 on the front and back sides of the retaining portion 3. Transversely to the bearing axis L, the width of the bearing portion 3 and of the retaining portion 2 is the same. On the side facing away from the retaining portion 2, the bearing portion 3 has two bearing surfaces 5, 6, which have a concavely cylindrical curvature having the same cylinder radius, but different cylinder axes. As is shown in FIG. 3, the respective cylinder axes of the bearing surfaces 5, 6 are located on the other side of the plane of symmetry than the associated bearing surface 5 or 6, wherein the distance between the cylinder axes and the plane of symmetry is identical in each case. Moreover, the cylinder axes are parallel to the bearing axis L.

Between the bearing surfaces 5, 6, the bearing element 1 is provided with a groove 7 extending in the direction of the bearing axis L. A central borehole 8, which extends through the bearing element 1 in the direction of the centre axis M and is connected to a cross borehole 9 intersecting said centre axis, opens into the groove 7. The cross borehole 9 extends through the retaining portion 2 perpendicularly to the plane of symmetry and has an opening in the two opposing lateral faces 10 of the bearing element 1. On the side located opposite the bearing surfaces 5, 6, the bearing element 1 has a planar support surface 11, which is used to support the bearing element 1 against the bearing forces acting on the bearing surfaces 5, 6.

The bearing element 1, on its own, is suitable for mounting a cylindrical workpiece bearing surface of a workpiece in a positionally precise manner since the bearing surfaces 5, 6 form a V-shaped mounting and centre the workpiece bearing surface with the axis thereof with respect to the centre axis M of the bearing element 1. The concave curvature of the bearing surfaces 5, 6 improves the contact with the workpiece mounting surface and causes a decrease in the Hertzian stress when a load is applied to the contact areas.

Figure 2:
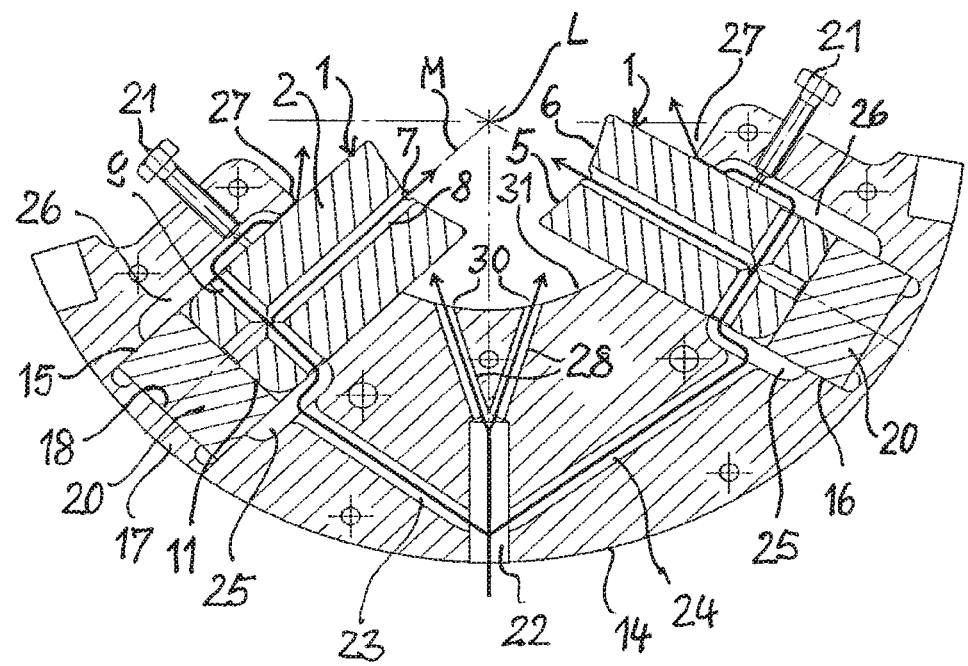
FIG. 2 shows a device according to the invention comprising two bearing elements arranged in a shared bearing pedestal.

Preferably, however, the bearing element 1 is used in bearing devices in which two or more bearing elements 1 are arranged in one bearing plane, which cooperate with the same workpiece bearing surface. Such a bearing device is shown in FIG. 2. A bearing pedestal 14 attached in a carrier part (not shown) of a machine intended for correcting unbalance comprises two pockets 15, 16, in each of which a bearing element 1 having the configuration shown in FIG. 1 is received. The pockets 15, 16 each form a cavity which is adapted to the cross-section of the retaining portion 2 of the bearing element 1 and in which the bearing portion 2 can be inserted, with the support surface 11 first, wherein the respective retaining portion 2 of the bearing elements is guided and supported by delimiting surfaces of the cavity in such a way that the centre axes M of the two bearing elements 1 intersect a bearing axis L in a point and extend perpendicularly with respect to the bearing axis L.

The depth of the pockets 15, 16 is greater than the axial length of the retaining portion 2 and ends at a pocket base 17, which forms a counter bearing surface 18 facing the support surface 11 of the bearing element 1. So as to set the bearing elements 1 to the diameter of the workpiece bearing surface of the workpiece to be supported, a respective cuboid setting plate 20 is arranged in the pockets 15, 16 between the pocket base 17 and the retaining portion of the bearing elements 1, which setting plate has parallel end faces by way of which it can be supported on the counter bearing surface 18 and on the support surface 11 of the bearing element 1. The setting plate 20 can be produced cost-effectively with great precision and, in a simple manner, allows the bearing element 1 to be set precisely and reliably to the diameter of the workpiece bearing surface to be supported. If a workpiece bearing surface having a different diameter is to be supported, only the setting plates 20 arranged in the two pockets 15, 16 have to be replaced. For repeatedly occurring diameters, it is possible to use setting plates 20, once they have been produced, again and again, whereby renewed setting is possible with little time expenditure. A tensioning screw 21, which can be tensioned against a lateral face 10 of the bearing element 1, is arranged in a threaded hole of a wall of the pockets 15, 16 for fixing the bearing elements 1 in the set position.

The two pockets 15, 16 are arranged in the bearing pedestal 14 in such a way that the centre axes M of the bearing elements 1 received therein form an angle of 110 degrees with one another. Deviating arrangements in which the pockets have a larger or smaller angular separation from one another, however, are likewise possible.

So as to mount a workpiece in a machine for correcting unbalance, it is advantageous if the bearing surfaces 5, 6 of the bearing elements 1 are cleaned using an air flow prior to adding a workpiece. So as to accomplish this, the bearing pedestal 14 includes a central feed channel 22, which can be connected to a compressed air source. Two distribution channels 23, 24 lead from the feed channel 22 to the pockets 15, 16. The pockets 15, 16 in the lateral delimiting surfaces thereof have recesses 25, into each of which a distribution channel 23 or 24 opens. The recesses 25 are dimensioned in such a way that one opening of the borehole 9 is located inside the recess 25 in any provided position of the bearing element 1. The other opening of the borehole 9 is located in a recess 26 which is formed in the wall of the pockets 15, 16 located opposite the recess 25. A groove in the pocket wall leads from the recess 26 to the open end of the pocket 15 or 16, where it forms an outlet opening 27. Moreover, two outlet channels 28 lead from the feed channel 22 to outlet openings 30 located in the delimiting surface 31 of the bearing pedestal 14 extending between the pockets 15, 16.

When compressed air is supplied to the feed channel 22, this reaches the outlet openings 27, 30 and, through the boreholes 8, the grooves 7 of the bearing elements 1, as is indicated by the thicker lines and arrows. Air exiting at the outlet openings 27, 30 and at the grooves 7 cleans chips and other impurities, which may end up there due to the removal of workpiece material during the correction of the unbalance, from the bearing surfaces 5, 6 and the regions of the bearing device surrounding these before and while a workpiece is added.

FIG. 3 is a view of a bearing element 1 in the viewing direction of the bearing axis, together with two workpiece bearing surfaces having differing diameters resting against the bearing surfaces 5, 6 and illustrated by the circles WL1 and WL2. The cylindrical bearing surface 5 of the bearing element 1 has a cylinder axis $Z_5$ and a cylinder radius $R_5$, and the bearing surface 6 has a cylinder axis $Z_6$ and a cylinder radius $R_6$. The cylinder radii $R_5$ and $R_6$ are identical. The cylinder axes $Z_5$ and $Z_6$ are located on the sides of the plane of symmetry E located opposite the bearing surfaces 5, 6 and at the same distance therefrom. The distance between the cylinder axes $Z_5$, $Z_6$ is denoted by By resting against the bearing surfaces 5, 6, the workpiece bearing surface $WL_1$ is positioned in such a way that the bearing axis $L_1$ thereof is located in the plane of symmetry E. The bearing surface 5 makes contact with the workpiece bearing surface $WL_1$ at the point of contact $B_{51}$, and the bearing surface 6 makes contact therewith at the point of contact $B_{61}$. The point of contact $B_{51}$ is located in a plane determined by the bearing axis $L_1$ and the cylinder axis $Z_5$. The point of contact $B_{61}$ is located in a plane determined by the bearing axis $L_1$ and the cylinder axis $Z_6$. The relationship of the distance between the points of contact $B_{51}$ and $B_{61}$ to the distance $A_z$ of the cylinder axes $Z_5$ and $Z_6$ is the same as the radius $R_1$ of the workpiece bearing surface to the difference between the cylinder radius $R_5$ or $R_6$ minus the radius $R_1$. Proceeding from this equation, it is possible to calculate the respective desired parameters, such as the cylinder radius of the bearing surface, the supportable radius of the workpiece bearing surface and the distance between the cylinder axes or the points of contact.

The workpiece bearing surface $WL_2$ has a smaller radius $R_2$ and a bearing axis $L_2$. Due to the smaller radius $R_2$, points of contact $B_{52}$ and $B_{62}$ which have a smaller distance between one another arise at the bearing surfaces.

The invention claimed is:

1. A device for receiving a workpiece in a machine for correcting an unbalance of the workpiece, comprising a bearing device, arranged on a machine frame, for rotatably mounting the workpiece about a bearing axis associated with a workpiece bearing surface, wherein the bearing device comprises a bearing pedestal including a first bearing element, which is composed of a rigid body and has two concavely cylindrical bearing surfaces located next to one another in an identical bearing plane and symmetrically with respect to a plane of symmetry containing the bearing axis and a center axis of the first bearing element, the cylinder radii thereof being greater than the radius of the workpiece bearing surface for which the bearing device is intended, and the cylinder axes of the two bearing surfaces being parallel to the bearing axis and having a distance between one another.

2. The device according to claim 1,
wherein the bearing pedestal further comprises at least a second bearing element,
wherein the first bearing element and the second bearing element are arranged next to one another in the identical bearing plane, the center axes of the two first and second bearing elements being aligned radially and perpendicularly with respect to the bearing axis and forming an angle with one another, and the first and second bearing elements being settable in relation to the bearing pedestal in the direction of the center axes thereof for adaptation to the radius of a workpiece bearing surface and being fixable on the bearing pedestal in a position that is adapted to the radius of the workpiece bearing surface.

3. The device according to claim 2, wherein the center axes of the first and second bearing elements form an angle in the range of 60° to 120° with one another.

4. The device according to claim 2, wherein the first and second bearing elements, on a side located opposite the bearing surfaces, have a support surface by way of which the first and second bearing elements respectively rest against first and second setting devices arranged in the bearing pedestal for setting a position that is adapted to the radius of the workpiece bearing surface.

5. The device according to claim 4, wherein the first setting device comprises at least one setting inserted in a space between the support surface of the first bearing element and a counter bearing surface formed in the bearing pedestal.

6. The device according to claim 5, wherein the at least one setting plate is cuboid and has parallel end faces resting against the support surface and the counter bearing surface, the distance between the end faces being variable by way of a material removal process.

7. The device according to claim 4, wherein the first setting device comprises a setting screw, which is arranged in a threaded hole in the bearing pedestal and is displaceable in relation to the bearing pedestal by rotation in the direction of the center axis.

8. The device according to claim 2, wherein the bearing pedestal includes a ventilation channel which, in addition to the first and second bearing elements, includes outlet openings, which are located in a delimiting surface of the bearing pedestal facing the bearing axis.

9. The device according to claim 1,
wherein the bearing pedestal includes a pocket which is open on one side and in which the first bearing element is guided and held in the direction of the center axis thereof, and
wherein the bearing element is securely clamped in the pocket by way of a clamping device or a clamping screw extending through the wall of the pocket.

10. The device according to claim 1, wherein the first bearing element has a groove, which extends between the bearing surfaces in the direction of the bearing axis and is connected to a borehole extending through the first bearing element.

11. The device according to claim 10, wherein the borehole in the first bearing element is connected to the ventilation duct in the bearing pedestal.

\* \* \* \* \*